May 25, 1943.  W. L. KAUFFMAN, 2D  2,320,324
WRINGER INDEX ASSEMBLY
Filed Jan. 30, 1941  2 Sheets-Sheet 2

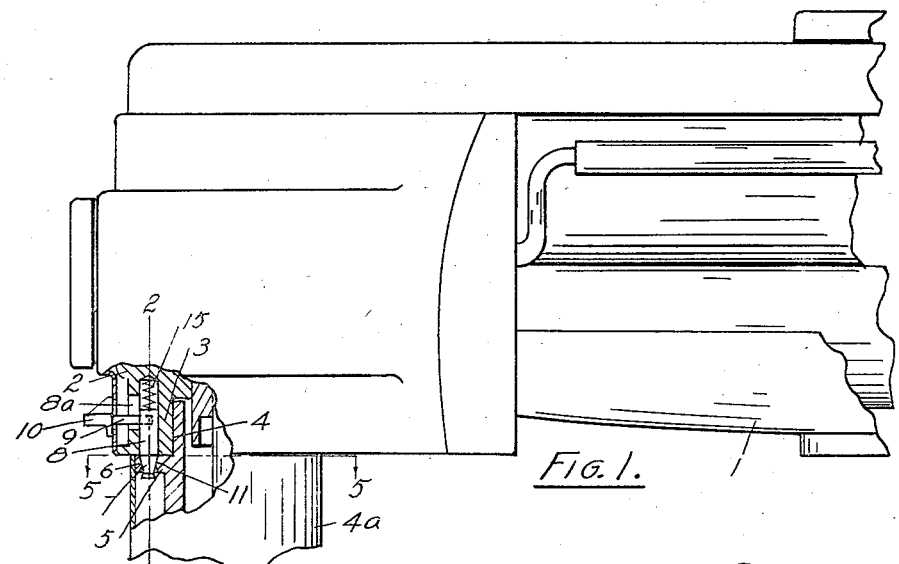
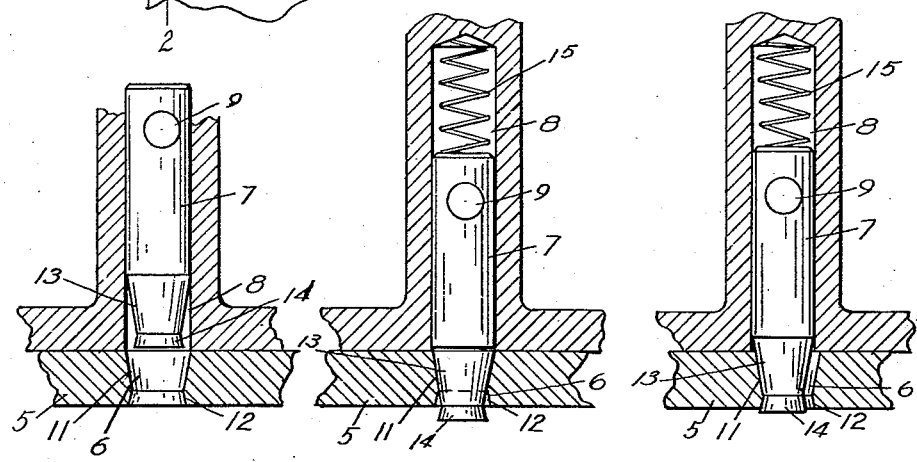
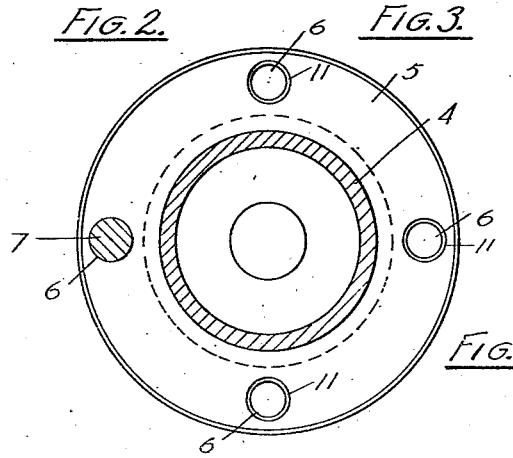

Walter L. Kauffman II
INVENTOR
BY
ATTORNEYS

Patented May 25, 1943

2,320,324

UNITED STATES PATENT OFFICE 2,320,324

WRINGER INDEX ASSEMBLY

Walter L. Kauffman, II, Erie, Pa., assignor to Lovell Manufacturing Company, Erie, Pa. a corporation of Pennsylvania Application January 30, 1941, Serial No. 376,641

4 Claims. (Cl. 68—274)

Power wringers are ordinarily mounted so that they may be turned to different positions over the washing-machine or over tubs adjacent to the washing machine. It is common to provide indexing means whereby the wringer may be locked in each adjusted position. The present invention is designed to simplify and make more definite the locking of the indexing mechanism at each adjustment. The driving pressure of the wringer, and the operating shocks that are received by the wringer, tend to loosen the indexing mechanism and with the continued vibration of the parts there is some difficulty in maintaining the wringer at the index position. The present invention is designed to obviate this difficulty. Features and details of the invention will appear from the specification and claims.

Preferred embodiments of the invention are illustrated in the accompanying drawings as follows:

Fig. 1 shows a front elevation of a wringer indexing mechanism being shown in section.

Fig. 2 shows an enlarged view of the indexing lock in unlocked position, in section on the line 2—2 in Fig. 1.

Fig. 3 a similar view with the lock in locked position.

Fig. 4 a similar view showing the lock worked toward release and the means for preventing release.

Fig. 5 a plan view of the indexing flange.

Figure 6:
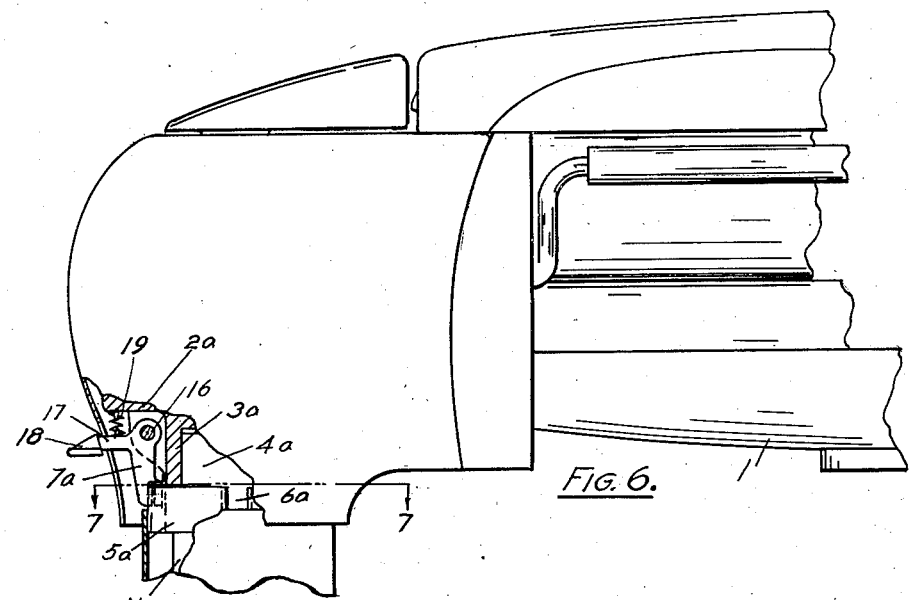

Fig. 6 an elevation of a wringer, including a modification of the indexing mechanism, the parts being broken away to show the indexing mechanism.

Figure 7:
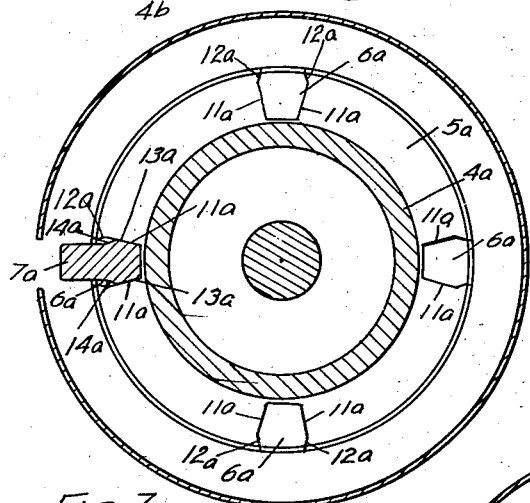

Fig. 7 a plan view of the indexing flange on the line 7—7 in Fig. 6.

Figure 8:
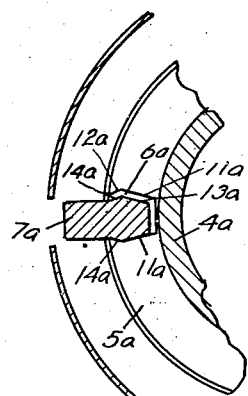

Fig. 8 a similar section showing the indexing mechanism moved toward release and indicating the locking mechanism preventing complete release.

Figure 9:
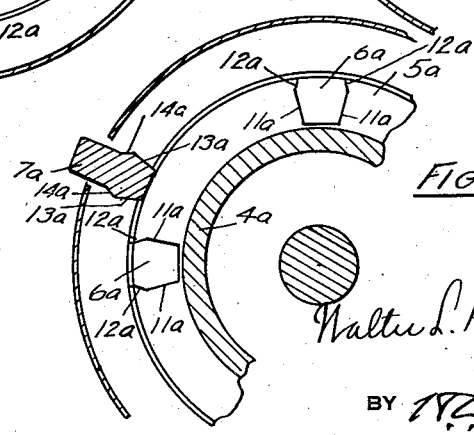

Fig. 9 a similar section showing the indexing means completely released.

1 marks the wringer frame, 2 the wringer head, 3 a swivel extension on the head, 4 a bearing on the upper end of the mounting post 4a, and 5 an indexing flange on the post.

The flange is provided with a series of index openings 6. A locking pin 7 is slidingly mounted in an opening 8 in the head. A pin 9 extends through a slot 8a in the head, this pin 9 being secured in the locking pin 7. The outer end of the pin 9 is provided with a handle 10 by means of which the locking pin may be drawn up to release position.

The openings 6 in the flange 5 are tapered at 11 and have a reverse or undercut taper 12. The locking pin 7 is provided with a taper 13 corresponding to taper 11, and a tapered head 14 corresponding to the taper 12. The locking pin is yieldingly forced downwardly to locking position by spring 15, the spring being arranged in the opening 8 above the locking pin.

When it is desired to position the wringer, the locking pin is lifted to the position shown in Fig. 2 and the wringer can then be swung to any position provided by the indexing mechanism, there being as many openings 6 as it is desired to have positions. When the locking pin is released and it enters an opening 6 the tapered surfaces 11 and 13 are brought into engagement so as to make rigid the setting of the wringer. In the forces to which the wringer is subjected by the driving mechanism and the feeding of the wringer the locking pin is apt to work upwardly and finally release itself. This is prevented in the present case by the engagement of the head or shoulder with the undercut portion of the opening 6, this engagement being indicated in Fig. 4.

In the modification shown in Figs. 6, 7, 8 and 9, the wringer 1 has the head 2a. This head is provided with a swivel extension 3a adapted to swivel on a bearing 4a on a post 4b. The post has the index flange 5a with radial openings or slots 6a. Locking levers 7a are adapted to enter the slot 6a to lock the wringer in position. The lever is pivotally mounted on a pin 16. A bell crank extension 17 terminates in a handle 18 by means of which the lever 7a may be swung. A spring 19 tends to force the lower end of the lever inwardly to yieldingly hold it in the notch.

The notches have the tapers 11a and an undercut taper 12a. The lever has a similar taper 13a engaging the taper 11a and a head or taper 14a engaging the taper 12a. It will readily be seen that as the lever is jarred loose or tended to be jarred loose it is moved from the position shown in Fig. 7 to that of Fig. 8. Here the head or reverse taper 14a engages the undercut shoulder 12a and prevents the complete release.

What I claim as new is:

1. In a wringer index assembly having a wringer head member and a post member on which the head member is swiveled, the combination with said post and head of an index mechanism comprising openings in one member each having an undercut portion and a locking element mounted on the other member, and adapted to enter, and be retracted from, the openings, said element having a shoulder resisting, through engagement with the undercut portion of the opening, the release movement of the element from the opening.

2. In a wringer index assembly having a wringer head member and a post member on which the head member is swiveled, the combination with said post and head of an index mechanism comprising openings in one member each having an undercut portion and a locking element mounted on the other member and adapted to enter, and be retracted from, the openings, said element having a shoulder resisting, through engagement with the undercut portion of the opening, the release movement of the element from the opening, said locking element and opening having tapered engaging surfaces.

3. In a wringer index assembly having a wringer head member and a post member on which the head member is swiveled the combination with said post and head of an index mechanism comprising openings in one member and a locking element movably mounted on the other member and adapted to enter, and be retracted from, the openings, said element and openings having tapered engagement surfaces, the openings having undercut portions with tapered surfaces, and the locking element a tapered head, said tapered head being adapted to engage the undercut portion and resisting a release movement of the element.

4. In a wringer index mechanism a wringer head member and a post member on which the head member is swiveled, one of said members having an index flange with radially extending notches, the notches having undercut portions, and a swinging locking finger adapted to enter the notches to lock the mechanism, and be retracted from said notches, said finger having a shoulder adapted to engage the undercut portion of the notches to resist a release movement.

WALTER L. KAUFFMAN, II.